United States Patent
Liu et al.

(10) Patent No.: US 7,028,680 B2
(45) Date of Patent: Apr. 18, 2006

(54) TWO STAGE MIXING SYSTEM FOR EXHAUST GAS RECIRCULATION (EGR)

(75) Inventors: Zhengbai Liu, Naperville, IL (US); Puning Wei, Naperville, IL (US)

(73) Assignee: International Engine Intellectual Property Company, LLC, Warrenville, IL (US)

( * ) Notice: Subject to any disclaimer, the term of this patent is extended or adjusted under 35 U.S.C. 154(b) by 0 days.

(21) Appl. No.: 10/945,591

(22) Filed: Sep. 21, 2004

(65) Prior Publication Data

US 2006/0060171 A1    Mar. 23, 2006

(51) Int. Cl.
F02M 25/07    (2006.01)

(52) U.S. Cl. .................................. 123/568.17

(58) Field of Classification Search ........... 123/568.11, 123/568.15, 568.17, 568.18, 568.19; 60/605.2
See application file for complete search history.

(56) References Cited

U.S. PATENT DOCUMENTS

| | | | | |
|---|---|---|---|---|
| 4,327,698 A * | 5/1982 | Hamai et al. | .......... | 123/568.17 |
| 4,461,150 A * | 7/1984 | Grohn | .................. | 123/568.17 |
| 5,884,612 A * | 3/1999 | Takeyama et al. | ..... | 123/568.17 |
| 6,138,651 A * | 10/2000 | Mori et al. | ............. | 123/568.17 |
| 6,267,106 B1 * | 7/2001 | Feucht | .................... | 123/568.17 |
| 6,343,594 B1 * | 2/2002 | Koeslin et al. | ........ | 123/568.17 |
| 6,425,382 B1 * | 7/2002 | Marthaler et al. | ..... | 123/568.17 |
| 6,609,374 B1 * | 8/2003 | Feucht et al. | .......... | 123/568.17 |

* cited by examiner

Primary Examiner—Willis R. Wolfe, Jr.
(74) Attorney, Agent, or Firm—Elias P. Soupos; Susan L. Lukasik; Dennis Kelly Sullivan

(57) ABSTRACT

A two stage mixing system mixes intake air with exhaust gases for exhaust gas recirculation (EGR) in an internal combustion engine. The two stage mixing system may have a two stage mixing device connected to an intake air conduit, a supply conduit, and an EGR conduit. The two stage mixing device may have a plenum disposed around a mixing conduit, which is connected to the intake air conduit and the supply conduit. The plenum is connected to one or more cross conduits and to the EGR conduit. The cross conduits extend across a mixing chamber formed by the mixing conduit. The cross conduits generate a higher velocity region in the intake air. The cross conduits direct the exhaust gases through one or more outlets into the higher velocity region. The cross conduits generate a vortex field in the exhaust gases and intake air. The exhaust gases mix with the intake air in the higher velocity region and in the vortex field.

26 Claims, 4 Drawing Sheets

TWO STAGE MIXING SYSTEM FOR EXHAUST GAS RECIRCULATION (EGR)

CROSS REFERENCE TO RELATED APPLICATIONS

Related applications include the following commonly assigned U.S. patent applications that have been filed on the same day as this application:

U.S. patent application Ser. No. 10/945,636, titled "Vortex Mixing System for Exhaust Gas Recirculation (EGR)," and filed on Sep. 21, 2004; and U.S. patent application Ser. No. 10/945,618, titled "Venturi Mixing System for Exhaust Gas Recirculation (EGR)," and filed on Sep. 21, 2004.

FIELD OF THE INVENTION

This invention generally relates to exhaust gas recirculation (EGR) systems in internal combustion engines. More particularly, this invention relates to EGR systems that have a mixing device to combine exhaust gases with intake air for combustion in the cylinders of an internal combustion engine.

BACKGROUND OF THE INVENTION

Internal combustion engines convert chemical energy from a fuel into mechanical energy. The fuel may be petroleum-based (gasoline or diesel), natural gas, a combination thereof, or the like. Some internal combustion engines, such as gasoline engines, inject an air-fuel mixture into one or more cylinders for ignition by a spark from a spark plug or the like. Other internal combustion engines, such as diesel engines, compress air in the cylinder and then inject fuel into the cylinder for the compressed air to ignite. A diesel engine may use a hydraulically activated electronically controlled unit injection (HEUI) system or the like to control the fuel injection into the cylinders. The ignited fuel generates rapidly expanding gases that actuate a piston in the cylinder. Each piston usually is connected to a crankshaft or similar device for converting the reciprocating motion of the piston into rotational motion. The rotational motion from the crankshaft may be used to propel a vehicle, operate a pump or an electrical generator, or perform other work. The vehicle may be a truck, an automobile, a boat, or the like.

Many internal combustion engines use exhaust gases to reduce the production of nitrogen oxides ($NO_X$) during the combustion process in the cylinders. These internal combustion engines typically mix a portion of the exhaust gases with the intake air for combustion in the cylinders. The exhaust gases usually lower the combustion temperature of the fuel below the temperature where nitrogen combines with oxygen to form $NO_X$.

There are various approaches for mixing the exhaust gases with the intake air in an internal combustion engine. Some internal combustion engines control the opening and closing of exhaust and intake valves in a cylinder. The opening and closing of the valves may trap and push some exhaust gases from the cylinder into the intake manifold for mixing with the intake air. Other internal combustion engines use an exhaust gas recirculation (EGR) system to divert a portion of the exhaust gases exiting the cylinders for mixing with the intake air to the cylinders.

Many EGR systems divert a portion of the exhaust gases from the exhaust manifold to the intake manifold of the engine. The exhaust manifold generally is an accumulation chamber above the cylinders that gathers the exhaust gases for expulsion from the vehicle. The intake manifold generally is another chamber above the cylinders that holds a combustion gas for the cylinders. The combustion gas may be all intake air or a combination of intake air and exhaust gases. The amount of exhaust gases in the combustion gas may vary during engine operation. The internal combustion engine may have a by-pass pipe to supply intake air directly to the intake manifold without exhaust gases.

EGR systems usually have an EGR conduit or pipe connected to the exhaust manifold. The EGR conduit may be a channel formed by the cylinder head or other engine component, a pipe or tube outside the cylinder head, a combination thereof, or the like. The EGR conduit may direct the exhaust gases through a gas trap and a gas cooling device prior to mixing the exhaust gases with the intake air. The gas trap usually is cleaning device for removing particulate from the exhaust gases. The gas cooling device may be a heat exchanger or other device for removing heat from the exhaust gases. The gas cooling device may use coolant from the engine cooling system, a separate cooling system, or a combination thereof. Some EGR systems have an orifice or other pressure measurement device to measure the exhaust gas flow through the EGR conduit.

Many EGR systems may have a control valve connected between the EGR conduit and the exhaust manifold. The engine controller or another microprocessor usually activates the control valve to adjust the flow of exhaust gases through the EGR conduit to achieve a selected concentration of exhaust gases in the intake air. The selected concentration of exhaust gases may vary during engine operation. The control valve may be actuated using a vacuum, a hydraulic fluid such as the hydraulic fluid used in fuel injectors, or the like. Some EGR systems open the control valve only when the pressure of the exhaust gases is higher than the pressure of the intake air. Some EGR systems have a valve in the exhaust duct to restrict the exhaust flow from the engine. The restricted flow increases the back pressure of the exhaust gases. The valve may open or close to control the amount of back pressure and thus may control the flow of exhaust gases into the intake air.

Many EGR systems have a mixing device at the connection of the EGR conduit with the intake conduit that supplies intake air for the cylinders. The intake conduit may be connected to the output of a compressor that pressurizes the intake air. The mixing device typically combines exhaust gases from the EGR conduit with intake air from the intake conduit to form the combustion gas for the cylinders. During engine operation, the exhaust gases usually flow into the intake air when the pressure of the exhaust gases is greater than the pressure of the intake air. The intake air pressure may vary especially when a turbocharger is used.

The mixing device typically is a pipe or other union between the EGR conduit and the intake conduit. The EGR and intake conduits may form a "tee" or similar connection. The mixing device may form a mixing chamber. The EGR conduit and/or intake conduit may expand to form the mixing chamber at the connection. The mixing device mixes the exhaust gases with the intake air to form the combustion gas. The mixing device usually supplies the combustion gas to the intake manifold through a supply pipe or conduit.

The mixing device may have an EGR conduit that extends into the intake conduit. The EGR conduit may create an obstacle that separates the intake air into two streams, each passing on an opposite side of the EGR conduit. The exhaust gas exits the EGR conduit and enters into a region of the mixing device where the two streams are essentially absent.

The two intake air streams combine with each other and with the exhaust gases downstream from the EGR conduit.

The mixing device may have a venturi for combining the exhaust gases with the intake air. The venturi typically forms part of the intake conduit. The venturi usually has an inlet connected to an outlet by a nozzle or throat. The inlet and outlet have larger diameters than the throat. The diameter of the intake conduit tapers down from the inlet to the throat and then tapers up from the throat to the outlet. The EGR conduit connects to the throat. The inlet may be connected to the compressor output of a turbocharger. The outlet is connected to the supply conduit for providing the combustion gas to the intake manifold.

In operation, the venturi creates a pressure drop in the intake air passing through the throat. The smaller diameter of the throat increases the velocity of the intake air. The increase in velocity lowers the pressure of the intake air in throat. The lower pressure of the intake air increases the amount of exhaust gases that can enter the throat for mixing with the intake air to form the combustion gas. At the outlet, the larger diameter decreases the velocity of the combustion gas. The decrease in velocity increases the pressure of the combustion gas.

Many mixing devices may not adequately blend the intake air with the exhaust gases to form a combustion gas with an essentially uniform dispersion of the exhaust gases in the intake air. While the exhaust gases and intake air are combined, there may be an uneven dispersion of the exhaust gases in the intake air. The uneven dispersion may include pockets, zones, regions, or strata of higher or lower concentrations of exhaust gases than the selected concentration of exhaust gases in the intake air. The dispersion may be more uneven when the exhaust gases enter on one side of the intake air stream. The selected concentration of exhaust gases in the intake air may be reduced to avoid or reduce the effects of the uneven dispersion on engine operation. Internal combustion engines may produce more $NO_x$ at the lower selected concentrations of exhaust gases in the intake air.

SUMMARY

This invention provides a two stage mixing system for exhaust gas recirculation (EGR) in an internal combustion engine. The two stage mixing system generates a high velocity region and a vortex field. The exhaust gases and intake air are mixed together in the high velocity region and in the vortex field.

A two stage mixing system for exhaust gas recirculation (EGR) in an internal combustion engine may have a two stage mixing device, an intake conduit, a supply conduit, and an EGR conduit. The intake air conduit is connected to the two stage mixing device. The supply conduit is connected to the two stage mixing device. The EGR conduit is connected to the two stage mixing device. The two stage mixing device generates a higher velocity region in the intake air from the intake air conduit. The two stage mixing device directs exhaust gases from the EGR conduit into the higher velocity region. The two stage mixing device generates a vortex field in the exhaust gases and intake air. The two stage mixing device provides a combustion gas to the supply conduit.

A two stage mixing system for exhaust gas recirculation (EGR) in an internal combustion engine may have a mixing conduit, an intake air conduit, a supply conduit, a plenum, an EGR conduit, and one or more cross conduits. The mixing conduit forms a mixing chamber. The intake air conduit is connected to the mixing conduit. The supply conduit is connected to the mixing conduit. The plenum is disposed on the circumference of the mixing conduit. The plenum forms an annular cavity. The EGR conduit is connected to the plenum. The cross conduits are disposed across the mixing chamber. Each cross conduit is connected at both ends to the plenum. Each cross conduit has an upstream side and a downstream side. Each cross conduit has a first transition region between the upstream and downstream sides. Each cross conduit has a second transition region between the upstream and downstream sides. Each cross conduit forms at least one outlet on the first and second transition regions.

A two stage mixing device for exhaust gas recirculation (EGR) in an internal combustion engine may have a mixing conduit, a plenum, and at least one cross conduit. The mixing conduit forms a mixing chamber. The plenum is disposed on the circumference of the mixing conduit. The plenum forms an annular cavity. The cross conduits are disposed across the mixing chamber. Each cross conduit is connected at both ends to the plenum. Each cross conduit has an upstream side and a downstream side. Each cross conduit has a first transition region between the upstream and downstream sides. Each cross conduit has a second transition region between the upstream and downstream sides. Each cross conduit forms one or more outlets on the first and second transition regions.

In a method for mixing exhaust gases with intake air in an internal combustion engine, a higher velocity region is generated in intake air. The exhaust gases are directed into the higher velocity region. A vortex field is generated in the exhaust gases and intake air.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
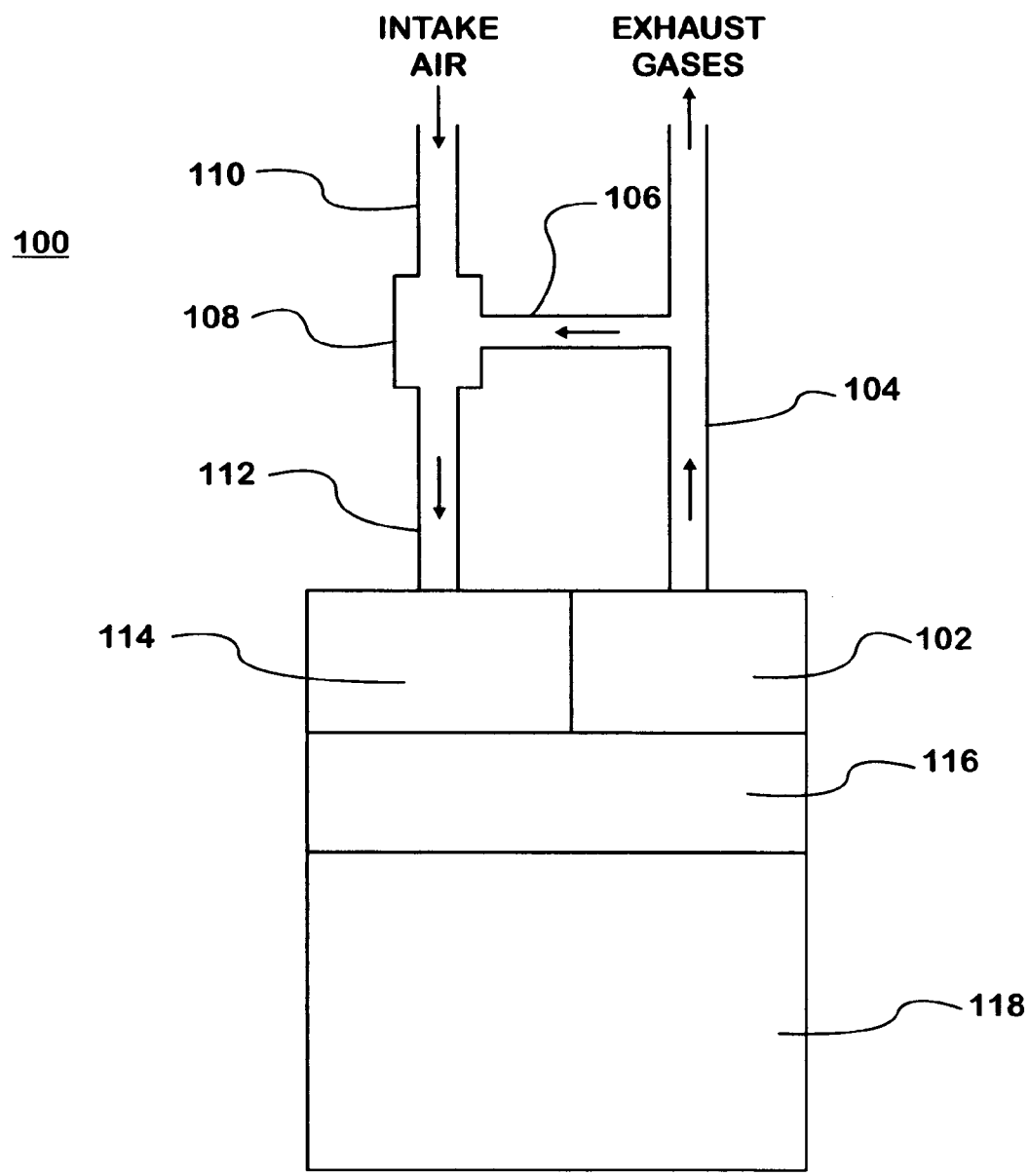
FIG. 1 is a schematic view of a two stage mixing system for exhaust gas recirculation (EGR) on an internal combustion engine.

FIG. 1 is a schematic view of an internal combustion engine 100 with a two stage mixing system for exhaust gas recirculation (EGR). Exhaust gases from the internal combustion engine 100 flow through an exhaust manifold 102 into an exhaust conduit 104. The internal combustion engine 100 diverts a portion of the exhaust gases from the exhaust conduit 104 through an exhaust gas recirculation (EGR) conduit 106 into a two stage mixing device 108. Intake air for the combustion of fuel in the internal combustion engine 100 flows through an intake air conduit 110 into the two stage mixing device 108. The two stage mixing device 108 mixes the exhaust gases with the intake air in a higher velocity region (the first stage) and a vortex field (the second stage). The two stage mixing device 108 generates the higher velocity region in the intake air, directs the exhaust gases into the higher velocity region, and generates the vortex field in the combination of exhaust gases and intake air. The exhaust gases and intake air mix in the higher velocity region and in the vortex field to form a combustion gas for the combustion of fuel in the internal combustion engine 100. The combustion gas flows from the two stage mixing device 108 through a supply conduit 112 into the intake manifold 114 of the internal combustion engine 100. While a particular configuration is shown, the internal combustion engine 100 with a two stage mixing system may have other configurations including those with additional components.

The internal combustion engine 100 has a cylinder head 116 connected to a crankcase 118. The exhaust manifold 102 and the intake manifold 114 are disposed adjacent to the cylinder head 116. The crankcase 118 forms one or more cylinders (not shown) arranged in an in-line, Vee, or other configuration. There may be multiple cylinder heads each with intake and exhaust manifolds such as when the cylinders are arranged in separate banks as in Vee or like configurations. During engine operation, the combustion gas flows from the intake manifold 114 into the cylinders. The combustion gas may comprise all intake air or a mixture of intake air and exhaust gases. The combustion gas may have a selected concentration of exhaust gases in the intake air. Selected concentration includes the percentage of exhaust gases in the combustion gas, a ratio of the amount of exhaust gases to the amount of intake air, or the like. The selected concentration may vary during engine operation. The combustion gas ignites fuel in the cylinders. The exhaust gases from the combustion of fuel flow from the cylinders into the exhaust manifold 102.

The exhaust manifold 102 connects to the exhaust conduit 104. The EGR conduit 106 connects the exhaust conduit 104 to the two stage mixing device 108. The EGR conduit 106 may have other components such as a gas cooler (not shown) and a gas trap (not shown). A control valve (not shown) may connect the EGR conduit 106 to the exhaust conduit 104. An engine controller (not shown) may operate the control valve to provide the selected concentration of exhaust gases in the combustion gas.

The two stage mixing device 108 is connected to the intake air conduit 110. The supply conduit 112 connects the two stage mixing device 108 to the intake manifold 114. The internal combustion engine 100 may have an intake air bypass (not shown) connecting the intake air conduit 110 directly to the supply conduit 112. The intake air bypass may provide intake air directly to the intake manifold 114 without exhaust gases.

The internal combustion engine 100 may have a turbocharger (not shown). The exhaust conduit 104 may connect to the turbine inlet of the turbocharger. The intake air conduit 110 may connect to the compressor outlet of the turbocharger.

During operation of the internal combustion engine 100, exhaust gases flow through the exhaust manifold 102 into the exhaust conduit 104. A portion of the exhaust gases is diverted through the EGR conduit 106 and into the two stage mixing device 108. The remaining exhaust gases may pass through the turbine of a turbocharger or another engine component prior to exiting. The intake air flows through the intake air conduit 110 into the two stage mixing device 108 for mixing with the exhaust gases from the EGR conduit 106. The two stage mixing device 108 mixes the exhaust gases with the intake air in two stages—a higher velocity region and a vortex field. The two stage mixing device 108 generates the higher velocity region in the intake air and directs the exhaust gases into the higher velocity region. The exhaust gases and intake air mix in the higher velocity region. The two stage mixing device 108 generates the vortex field in the combination of intake air and exhaust gases. The vortex field has at least one vortex that mixes the exhaust gases with the intake air. This two stage mixing of exhaust gases with intake air forms the combustion gas for combustion of fuel in the cylinders. The combustion gas flows from the two stage mixing device 108 through the supply conduit 112 into the intake manifold 114 of the internal combustion engine 100.

Figure 2:
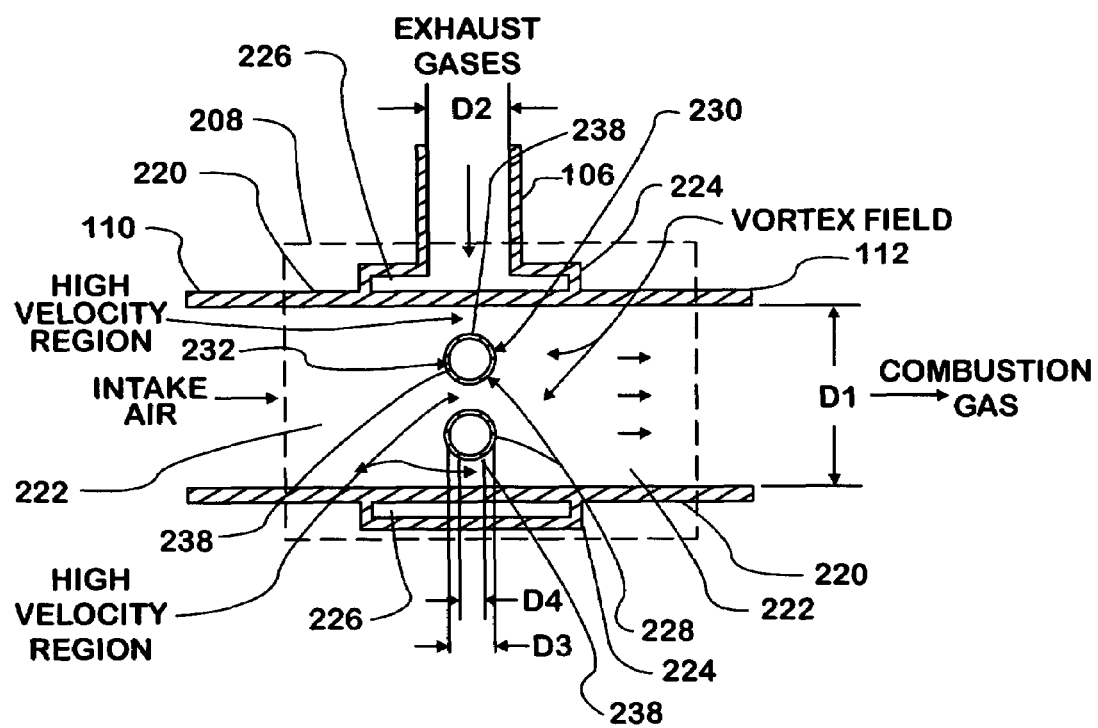
FIG. 2 is a side cross-section view of a two stage mixing device for the two stage mixing system of FIG. 1.
Figure 3:
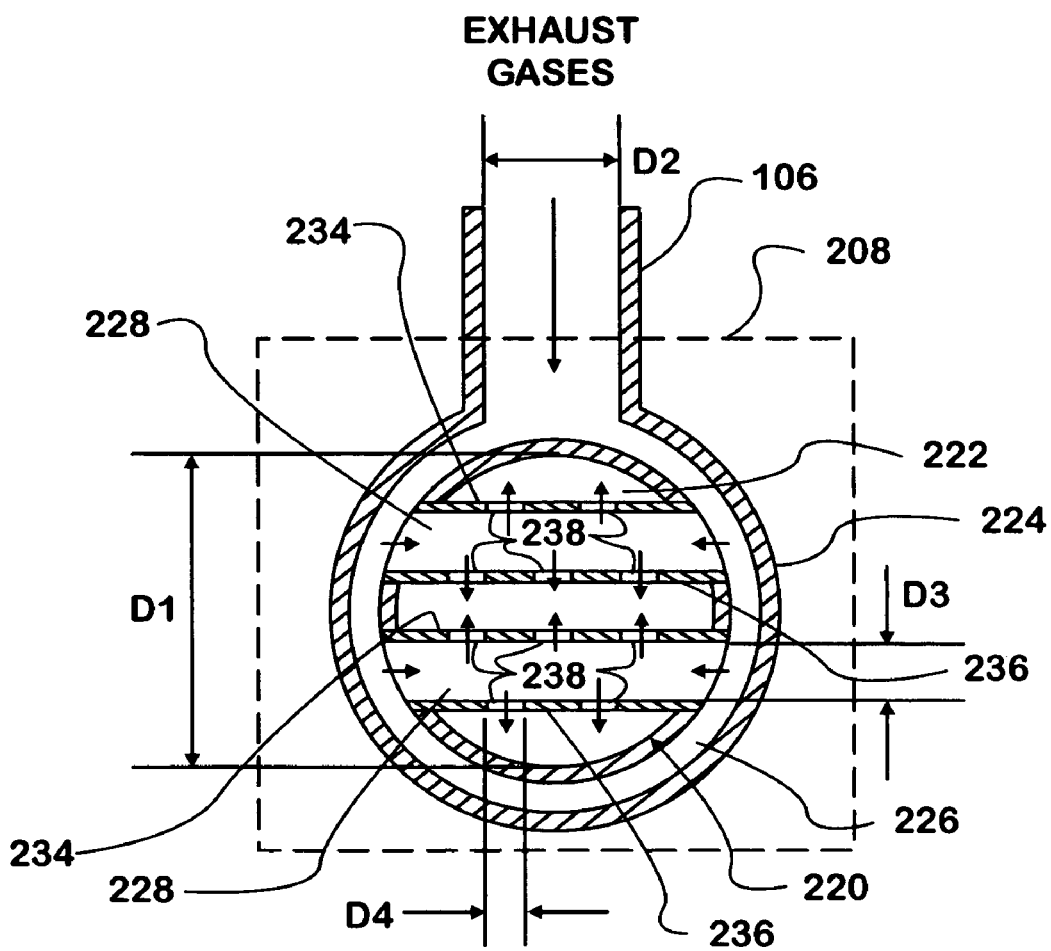
FIG. 3 is a top cross-section view of the two stage mixing device of FIG. 2.

FIGS. 2–3 are cross-section views of a two stage mixing device 208 for a two stage mixing system. The two stage mixing device 208 has a mixing conduit 220 that connects to the intake air conduit 110 and to the supply conduit 112. The mixing conduit 220 has essentially the same inside diameter as the intake air conduit 110 and the supply conduit 112. The mixing conduit 220 may be part or an extension of the intake air conduit 110, the supply conduit 112, or a combination thereof. The mixing conduit 220, the intake air conduit 110, and the supply conduit 112 may be the same component. The mixing conduit 220 forms a mixing chamber 222.

The mixing conduit 220 has a mixing conduit diameter, D1. The EGR conduit 106 has an EGR conduit diameter, D2. The ratio of the EGR conduit diameter to the mixing conduit diameter, D2:D1, may be greater than about 0.11 and less than about 0.77. The ratio of D2:D1 may be about 0.5. Other ratios of D2:D1 may be used.

The EGR conduit 106 connects to a plenum 224 disposed tangentially along the circumference of the mixing conduit 220. The plenum 224 forms an annular cavity 226 that surrounds a portion of the mixing conduit 220. The plenum 224 has one or more cross conduits 228 that span the mixing chamber 222. The plenum 224 may be connected to two or another number of cross conduits 228.

One or more of the cross conduits 228 may have a cross conduit diameter, D3. The mixing conduit 220 has a mixing conduit diameter, D1. The ratio of the cross conduit diameter to the mixing conduit diameter, D3:D1, may be greater than about 0.04 and less than about 0.55. The ratio of D3:D1 may be about 0.225. Other ratios of D3:D1 may be used.

Each cross conduit 228 extends across the mixing chamber 222 with both ends connected to the plenum 224. Each cross conduit 228 is essentially perpendicular to the mixing chamber 222. Multiple cross conduits 228 may be parallel to each other. The cross conduits 228 may be aligned with the EGR conduit 106 or may be aligned at an angle to the EGR conduit 106. The angle may position the cross conduits 228 perpendicular to the EGR conduit 106. Other arrangements of the cross conduits 228 may be used.

Each cross conduit 228 has an essentially cylindrical shape with a downstream side 230, an upstream side 232, a first transition region 234, and a second transition region 236. The downstream side 230 is opposite the upstream side 232. The downstream side 230 faces the connection of the supply conduit 112 with the mixing conduit 220. The upstream side 232 faces the connection of the intake air conduit 110 with the mixing conduit 220. The first transition region 234 is opposite the second transition region 236. The first transition region 234 is between the downstream side 230 and the upstream side 232. The second transition region 236 is between the downstream side 230 and the upstream side 232. The first transition region 234 and the second transition region 236 have an alignment essentially perpendicular to the mixing conduit 220 and face opposite sides of the mixing conduit 220. Each transition region 234 and 236 includes a longitudinal line or longitudinal surface area on the cross conduit 228 where the upstream side 232 transitions to the downstream side 230 and the downstream side 230 transitions to the upstream side 232. When the two stage mixing device 208 is assembled, the transition regions 234 and 236 are aligned essentially perpendicular to the flow of intake air in the mixing chamber 222.

Each cross conduit 228 forms one or more outlets 238 on the first and second transition regions 238. Multiple outlets 238 may be positioned equidistantly from each other on the transition regions. The outlets 238 may have other positions on the transition regions. The outlets 238 are openings into the cross conduit 228 that direct the flow of exhaust gases into the mixing chamber 222. The outlets 238 may be orifices with the same or different shapes. The orifices may have circular, angular, rectangular, a combination thereof, or like configurations. The outlets 238 may be slots with the same or different shapes. The slots may have a narrow rectangular or like configuration. A narrow rectangular configuration may have two longer sides in parallel adjacent to two shorter sides opposite each other. The shorter sides may have an essentially straight or circular shape. The shorter sides may be convex, concave, or a combination thereof. Each cross conduits 228 may have five or another number of outlets 238. The outlets on adjacent cross conduits may be aligned (where the outlets face each other), staggered (where the outlets do not face each other), or a combination thereof. Other arrangements of the outlets 238 may be used.

One or more of the outlets 238 may have an outlet diameter, D4. The mixing conduit 220 has a mixing conduit diameter, D1. The ratio of the outlet diameter to the mixing conduit diameter, D4:D1, may be greater than about 0.022 and less than about 0.44. The ratio of D4:D1 may be about 0.185. Other ratios of D4:D1 may be used.

In operation, the exhaust gases flow from the EGR conduit 106 into the annular cavity 226 formed by the plenum 224. The exhaust gases flow from the annular cavity 226 through the cross conduits 228. The exhaust gases may enter each cross conduit 228 from either or both ends. The plenum 224 may substantially equalize the pressure and flow of exhaust gases through the cross conduits 228. The exhaust gases flow through the outlets 238 into the mixing chamber 222.

As exhaust gases flow from the EGR conduit 106 into the mixing chamber 222, intake air flows through the intake air conduit 110 into the mixing chamber 222. The intake air has a normal velocity in the intake air conduit and upon entry into the mixing chamber 222. The normal velocity could be any desired or selected velocity such as a velocity for operation of the engine.

As the intake air passes through the mixing chamber 222, the cross conduits 228 generate a higher velocity region in the intake air. The intake air flows past the upstream side 232 toward the first and second transition regions 234 and 236 of the cross conduits 228. The velocity of the intake air increases when flowing past the upstream side 232. As the velocity increases, the pressure of the intake air deceases. When the intake air flows past the first and second transition regions 234 and 236, the velocity of the intake air reaches essentially a maximum velocity and the pressure of the intake air reaches essentially a minimum pressure. On the downstream side 230, the velocity decreases from the maximum velocity and the pressure increases from the minimum pressure.

The higher velocity region includes locations in the mixing chamber 222 where the velocity of the intake air is higher than the normal velocity of the intake air. The higher velocity region may be adjacent to the upstream side 232, the first and second transition regions 234 and 236, and the downstream side 230. Adjacent includes near, in closer proximity, and adjoining. The higher velocity region may span substantially the entire cross-section of the mixing chamber 222 adjacent to the cross conduits 228. The higher velocity region may include multiple higher velocity regions, which may be adjacent to the first and second transition regions 234 and 236. The higher velocity region may have a minimum pressure portion. The minimum pressure portion includes locations in the higher velocity region where the intake air has essentially the minimum pressure. The minimum pressure portion may include multiple minimum pressure portions, which may be adjacent to the first and second transition regions 234 and 236 of each cross conduit 228.

The outlets 238 direct the exhaust gases into the higher velocity region of the intake air. The lower pressure in the higher velocity region may permit more exhaust gases to enter the intake air than in intake air at the normal velocity. The higher velocity region increases the pressure difference between the exhaust gases and the intake air, thus driving more exhaust gases into the intake air.

The outlets 238 may direct the exhaust gases into a higher velocity region adjacent to the first and second transition regions 234 and 236 on the cross conduits 228. The outlets 238 may direct the exhaust gases into a minimum pressure portion of the higher velocity region. The exhaust gases mix with the intake air in the higher velocity region. The combination of exhaust gases and intake air flow past the downstream side 230 of the cross conduits 228.

The cross conduits 228 generate a vortex field adjacent to the downstream sides 230 of the cross conduits 228. On each cross conduit 228, the intake air forms a boundary layer along the surface of the upstream side 232. The pressure at the boundary layer decreases gradually as the intake air moves along the upstream side 232 toward the first and second transition regions 234 and 236. The pressure at the boundary layer reaches the minimum pressure as the intake air moves along the first and second transition regions 234 and 236. The boundary layer stays attached to the cross conduit 228 while the pressure decreases or is at the minimum pressure.

The outlets 238 on the cross conduits 228 direct the exhaust gases into the intake air. The combination of intake air and exhaust gases moves along the downstream side 230 away from the first and second transition regions 234 and 236 of the cross conduit 228. The pressure at the boundary layer increases as the intake air and exhaust gases move along the downstream side 230. The increasing pressure causes the boundary layer to separate from the downstream side 230. As the boundary layer separates, the intake air and exhaust gases form a vortex that detaches from the downstream side 230. Each cross conduit 228 may generate one or more vortices as the intake air and exhaust gases flow along the downstream side 230.

The vortices form a vortex field adjacent to the downstream sides 230 of the cross conduits 228. The vortex field includes different types of vortex fields adjacent to the downstream sides 230 of the cross conduits 228. The vortices may create one or more individual vortex fields, each adjacent to the downstream side 230 of a cross conduit 228. The vortices may create one or more group vortex fields each adjacent to multiple cross conduits 228. The vortices may create a combination of one or more group vortex fields with one or more individual vortex fields. The number and type of vortex fields may vary.

The vortex field mixes the exhaust gases with the intake air. Each vortex is a mass of swirling intake air and/or exhaust gases. Each vortex draws other exhaust gases and/or other intake air toward the center of the vortex. The exhaust gases and intake air mix in the vortices. The vortex field also may generate a more turbulent wake that mixes exhaust gases with the intake air.

These two stages—the higher velocity region and the vortex field—mix the exhaust gases with the intake air to form the combustion gas for the cylinders in the engine. The combustion gas flows from the mixing chamber 222 into the supply conduit 112.

Figure 4:
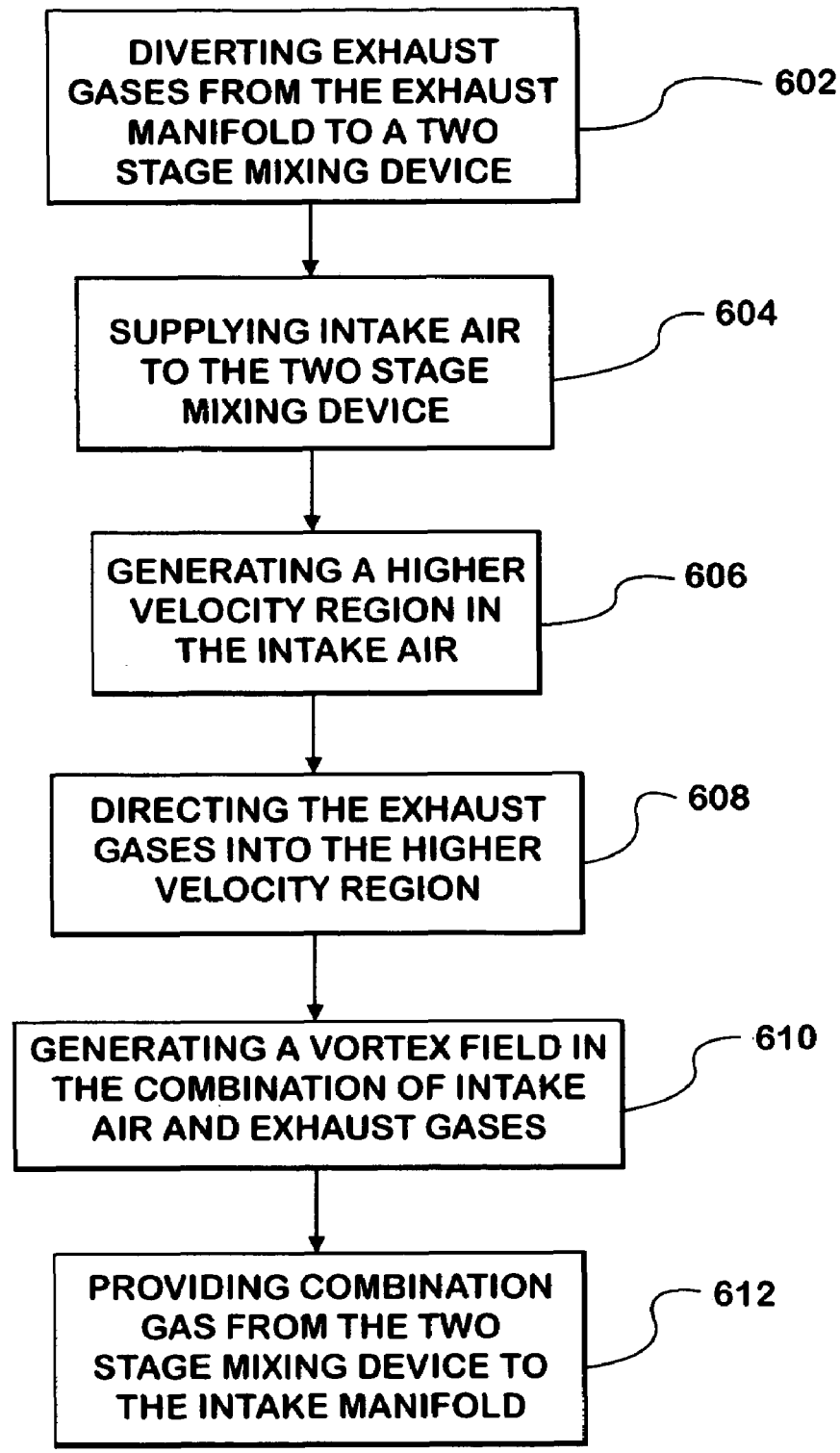
FIG. 4 is a flowchart of a method for mixing exhaust gases with intake air in an internal combustion engine.

FIG. 4 is a flowchart of a method for mixing exhaust gases with intake air in an internal combustion engine. The exhaust gases and intake air are mixed in a higher velocity region and a vortex field as previously discussed.

In block 602, the exhaust gases are diverted from the exhaust manifold to a two stage mixing device. The exhaust gases exit the cylinders in the internal combustion engine and accumulate in the exhaust manifold. The exhaust gases flow from the exhaust manifold through an exhaust conduit to exit the engine. The exhaust conduit may be connected to a turbine inlet for the exhaust gases to pass through the turbine portion of a turbocharger prior to exiting. An EGR conduit connects the exhaust conduit to the two stage mixing device. The EGR conduit diverts a portion of the exhaust gases from the exhaust conduit to the two stage mixing device. The amount of exhaust gases diverted to the two stage mixing device may be controlled to provide a selected concentration of exhaust gases in the intake air. The selected concentration may vary during engine operation. Other exhaust gas recirculation systems including those with additional components may be used to divert a portion of the exhaust gases to the two stage mixing device.

In block 604, intake air is supplied to the two stage mixing device. An intake air conduit is connected to the two stage mixing device. Intake air flows through the intake air conduit to the two stage mixing device. The intake air conduit may be connected to the compressor outlet of a turbocharger.

In block 606, a two stage mixing device generates a higher velocity region in the intake air. The intake air has a normal velocity when entering the two stage mixing device. The normal velocity may be any selected or desired velocity of the intake air. As the intake air flows past the upstream side of one or more cross conduits, the velocity of the intake air increases and the pressure of the intake air decreases. As the intake air passes the first and second transition regions on each cross conduit, the intake air may reach a maximum velocity and may reach a minimum pressure. The velocity decreases and the pressure increases along the downstream sides of the cross conduits. The higher velocity region includes locations where the intake air velocity is higher than the normal velocity. The two stage mixing device may generate a minimum pressure portion in the higher velocity region. The minimum pressure portion includes locations where the intake air has essentially the minimum pressure.

In block 608, the exhaust gases are directed into the higher velocity region. Each cross conduit in the two stage mixing device has one or more outlets. The outlets may be slots, orifices, or other openings formed on the first and second transition regions of the cross conduit. The outlets direct the flow of exhaust gases into the higher velocity region. The lower pressure of the higher velocity region may permit more exhaust gases into the intake air than intake air at the normal velocity. The outlets may direct the flow of exhaust gases into the minimum pressure portion of the higher velocity region. The combination of exhaust gases and intake air flows past the downstream sides of the cross conduits.

In block 610, a two stage mixing device generates a vortex field. The vortex field mixes the exhaust gases with the intake air. As intake air flows past the cross conduits, the intake air forms boundary layers along the upstream sides of the cross conduits. The exhaust gases are directed into the intake air. The combination of exhaust gases and intake air flows past the downstream sides of the cross conduits. The boundary layers may separate from the downstream sides and form one or more vortices. The vortices form a vortex field adjacent to the downstream sides of the cross conduits. The swirling action of the vortices draws other exhaust gases and/or intake air into the center of the vortex. The exhaust gases and intake air mix in the vortices. The exhaust gases and intake air also may mix in the more turbulent wake of the vortex field. The mixture of exhaust gases and intake air forms the combustion gas for combustion of fuel in the cylinders of the engine.

In block 612, the combustion gas is provided to the intake manifold of the engine. A supply conduit connects the two stage mixing device to the intake manifold. The combustion gas flows from the two stage mixing device to the intake manifold.

While various embodiments of the invention have been described, it will be apparent to those of ordinary skill in the art that other embodiments and implementations are possible within the scope of the invention. Accordingly, the invention is not to be restricted except in light of the attached claims and their equivalents.

What is claimed is:

1. A two stage mixing system for exhaust gas recirculation (EGR) in an internal combustion engine, comprising:
   a two stage mixing device;
   an intake air conduit connected to the two stage mixing device;
   a supply conduit connected to the two stage mixing device;
   an EGR conduit connected to the two stage mixing device;
   a mixing conduit connected to the intake air conduit and to the supply conduit, where the mixing conduit forms a mixing chamber;
   a plenum connected to the EGR conduit, where the plenum is disposed on the circumference of the mixing conduit, and where the plenum forms an annular cavity; and
   at least one cross conduit disposed across the mixing chamber, where each cross conduit is connected at both ends to the plenum;
   where the two stage mixing device generates a higher velocity region in intake air from the intake air conduit;
   where the two stage mixing device directs exhaust gases from the EGR conduit into the higher velocity region;
   where the two stage mixing device provides a combustion gas to the supply conduit.

2. The two stage mixing system of claim 1,
   where the higher velocity region has minimum pressure portion; and
   where the two stage mixing device directs the exhaust gases into the minimum pressure portion.

3. The two stage mixing system of claim 1, where the at least one outlet is at least one of an orifice and a slot.

4. The two stage mixing system of claim 1, where the combustion gas has a selected concentration of exhaust gases in the intake air.

5. The two stage mixing system of claim 1,
   where each cross conduit has an upstream side and a downstream side, where each cross conduit has a first transition region between the upstream and downstream sides, where each cross conduit has a second transition region between the upstream and downstream sides, where each cross conduit forms at least one outlet on the first and second transition regions, and where the at least one outlet directs the exhaust gases into the higher velocity region.

6. The two stage mixing system of claim 5, where the higher velocity region has minimum pressure portion; and
where the at least one outlet directs the exhaust gases into the minimum pressure portion.

7. The two stage mixing system of claim 5, where the at least one cross conduit generates the vortex field adjacent to the downstream side.

8. A two stage mixing system for exhaust gas recirculation (EGR) in an internal combustion engine, comprising:
a mixing conduit forming a mixing chamber;
an intake air conduit connected to the mixing conduit;
a supply conduit connected to the mixing conduit;
a plenum disposed on the circumference of the mixing conduit, where the plenum forms an annular cavity;
an EGR conduit connected to the plenum; and
at least one cross conduit disposed across the mixing chamber, where each cross conduit is connected at both ends to the plenum, where each cross conduit has an upstream side and a downstream side, where each cross conduit has a first transition region between the upstream and downstream sides, where each cross conduit has a second transition region between the upstream and downstream sides, and where each cross conduit forms at least one outlet on the first and second transition regions.

9. The two stage mixing system of claim 8, where the at least one outlet is at least one of an orifice and a slot.

10. The two stage mixing system of claim 8, further comprising:
an exhaust conduit connected to the EGR conduit;
an exhaust manifold connected to the exhaust conduit; and
an intake manifold connected to the supply conduit.

11. The two stage mixing system of claim 8,
where the mixing conduit has a mixing conduit diameter;
where the EGR conduit has an EGR conduit diameter;
where the ratio of the EGR conduit diameter to the mixing conduit diameter is greater than about 0.11; and
where the ratio of the EGR conduit diameter to the mixing conduit diameter is less than about 0.77.

12. The two stage mixing system of claim 11, where the ratio of the EGR conduit diameter to the mixing conduit diameter is about 0.5.

13. The two stage mixing system of claim 8,
where the mixing conduit has a mixing conduit diameter;
where the at least one cross conduit has a cross conduit diameter;
where the ratio of the cross conduit diameter to the mixing conduit diameter is greater than about 0.04; and
where the ratio of the cross conduit diameter to the mixing conduit diameter is less than about 0.55.

14. The two stage mixing system of claim 13, where the ratio of the cross conduit diameter to the mixing conduit diameter is about 0.225.

15. The two stage mixing system of claim 8,
where the mixing conduit has a mixing conduit diameter;
where each outlet has an outlet diameter;
where the ratio of the outlet diameter to the mixing conduit diameter is greater than about 0.022; and
where the ratio of the outlet diameter to the mixing conduit diameter is less than about 0.44.

16. The two stage mixing device of claim 15, where the ratio of the outlet diameter to the mixing conduit diameter is about 0.185.

17. A two stage mixing device for exhaust gas recirculation (EGR) in an internal combustion engine, comprising:
a mixing conduit forming a mixing chamber;
a plenum disposed on the circumference of the mixing conduit, where the plenum forms an annular cavity; and
at least one cross conduit disposed across the mixing chamber, where each cross conduit is connected at both ends to the plenum, where each cross conduit has an upstream side and a downstream side, where each cross conduit has a first transition region between the upstream and downstream sides, where each cross conduit has a second transition region between the upstream and downstream sides, and where each cross conduit forms at least one outlet on the first and second transition regions.

18. The two stage mixing device of claim 17, where the at least one outlet is at least one of an orifice and a slot.

19. The two stage mixing device of claim 17,
where the mixing conduit has a mixing conduit diameter;
where the at least one cross conduit has a cross conduit diameter;
where the ratio of the cross conduit diameter to the mixing conduit diameter is greater than about 0.04; and
where the ratio of the cross conduit diameter to the mixing conduit diameter is less than about 0.55.

20. The two stage mixing device of claim 19, where the ratio of the cross conduit diameter to the mixing conduit diameter is about 0.225.

21. The two stage mixing device of claim 19,
where the mixing conduit has a mixing conduit diameter;
where each outlet has an outlet diameter;
where the ratio of the outlet diameter to the mixing conduit diameter is greater than about 0.022; and
where the ratio of the outlet diameter to the mixing conduit diameter is less than about 0.44.

22. The two stage mixing device of claim 21, where the ratio of the outlet diameter to the mixing conduit diameter is about 0.185.

23. A method for an internal combustion engine, comprising the steps of:
flowing an amount of exhaust gas into an exhaust conduit;
diverting a portion of the amount of exhaust gas into an EGR conduit that is connected to a plenum;
flowing an amount of intake air into an intake air conduit;
mixing the amount of intake air with the portion of exhaust gas in a mixing conduit that is disposed between the intake air conduit and the plenum;
injecting exhaust gas from at least two locations of the plenum that are connected to each other with at least one cross conduit.

24. The method for an internal combustion engine of claim 23, further comprising the step of equalizing a pressure and a flow of exhaust gas through the at least one cross conduit.

25. The method for an internal combustion engine of claim 23, wherein the step of injecting exhaust gas is accomplished by flowing exhaust gas through outlets in the at least one cross conduit.

26. The method for an internal combustion engine of claim 25, further comprising the step of directing exhaust gas from the outlets into a higher velocity region of the intake air.

* * * * *